Oct. 4, 1932.  E. A. SEABERG  1,881,329
AUTOMOBILE LIGHT
Filed July 1, 1931  2 Sheets-Sheet 1
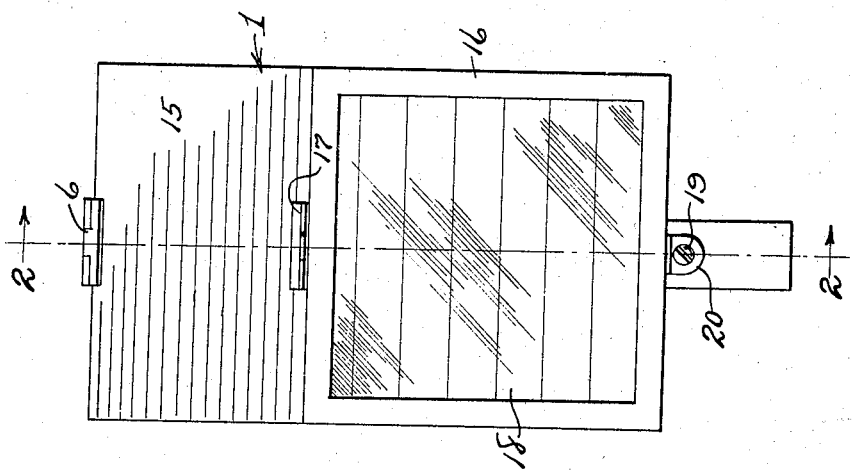
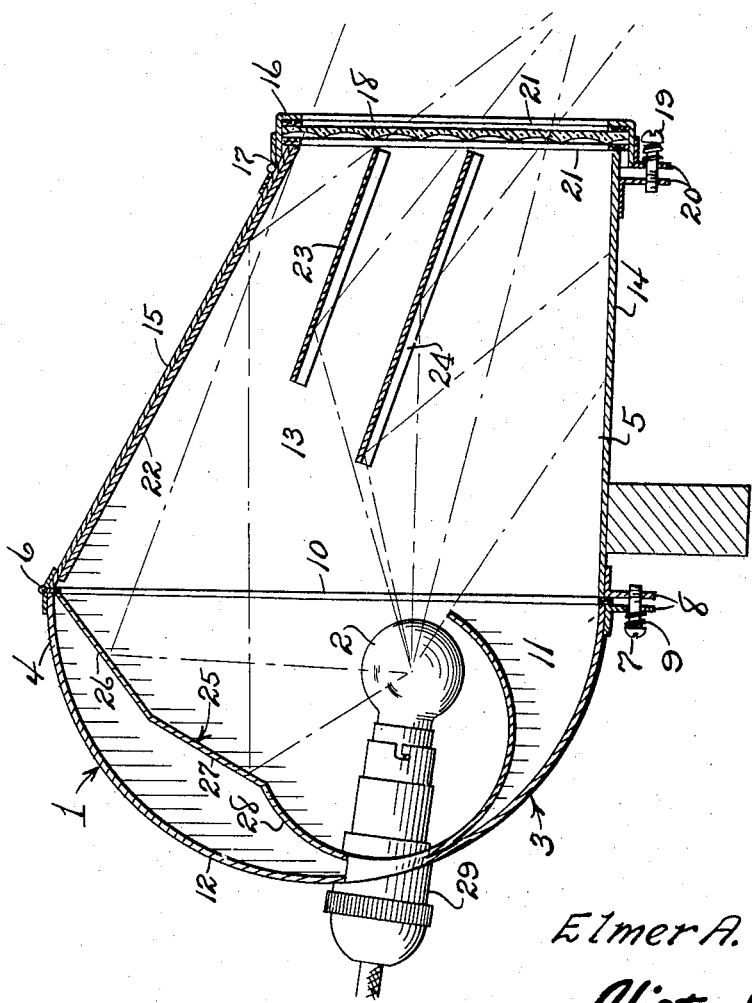
Elmer A. Seaberg
INVENTOR
BY Victor J. Evans
and Co. ATTORNEY Oct. 4, 1932.  E. A. SEABERG  1,881,329
AUTOMOBILE LIGHT
Filed July 1, 1931   2 Sheets-Sheet 2
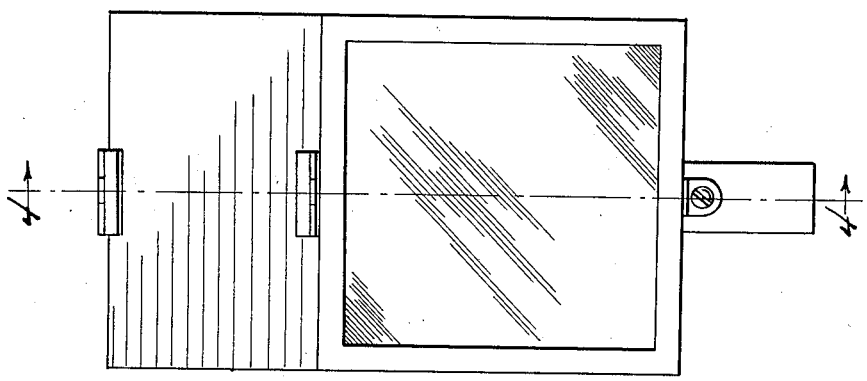
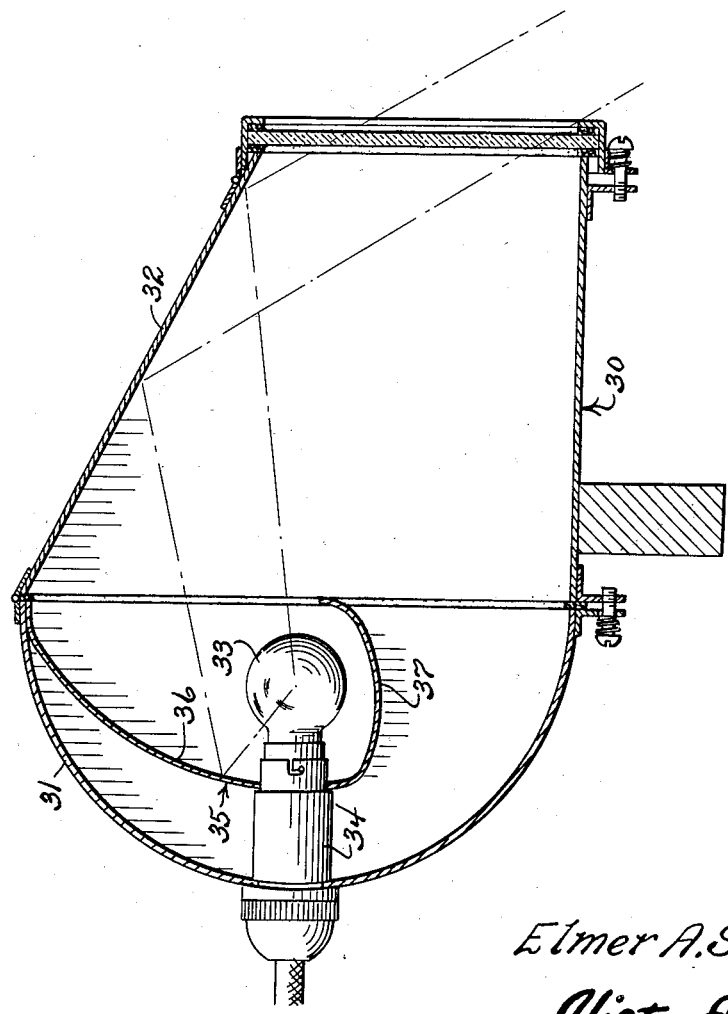
Elmer A. Seaberg
INVENTOR
BY Victor J. Evans
and Co.  ATTORNEY Patented Oct. 4, 1932

1,881,329

UNITED STATES PATENT OFFICE

ELMER A. SEABERG, OF PUEBLO, COLORADO

AUTOMOBILE LIGHT

Application filed July 1, 1931. Serial No. 548,233.

This invention relates to automobile lights and has for the primary object, the provision of means for receiving the rays of light from the illuminating means and reflecting them in a path forwardly and downwardly from the light casing so that objectionable glare to approaching persons will be obviated and still provide an efficient illumination of the roadway for the respective automobile.

Another object of this invention is the provision of an automobile light of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a front elevation illustrating an automobile light constructed in accordance with my invention.

Figure 2 is a sectional view taken on the line 2—2 of Figure 1.

Figure 3 is a front elevation illustrating a modified form of my invention.

Figure 4 is a sectional view taken on the line 4—4 of Figure 3.

Referring in detail to the drawings, the numeral 1 indicates an automobile light capable of receiving the light rays from the electric lamp 2 and reflecting them outwardly of the casing 3 in a downward and forward path so that direct rays of light into the eyes of an approaching person from the electric lamp is obviated.

The casing 3 includes sections 4 and 5 connected together at their upper edges by a hinge 6 and detachably secured at their lower edges by a bolt or like fastener 7 extending through apertured ears 8 on said sections and having threaded engagement with one of the ears. An expansion spring 9 is located on the bolt between the head thereof and one of the ears 8 to prevent said bolt from accidentally becoming unthreaded from one of the ears 8. A gasket 10 is interposed between the sections 4 and 5.

The section 4 of the casing includes side walls 11 and an arcuately curved rear wall 12 while the section 5 includes side walls 13, a straight bottom wall 14 and a downwardly and forwardly inclined top wall 15. The side walls 13, bottom wall 14 and top wall 15 cooperate in forming the forward end of the section 5 of substantially rectangular shape engaged by a lens supporting rim 16 hinged to the top wall as shown at 17 and has mounted therein a suitable lens 18. The lower edge of the rim 16 is detachably secured to the bottom wall 14 by a bolt or like fastener 19 extending through apertured ears 20 and having threaded engagement with one of said ears. The ears are secured to the bottom wall 14 and the lens rim 16. Gaskets 21 are positioned against opposite faces of the lens 18 and bear against the section 5 of the casing and the rim 16.

The inner face of the bottom wall 14 and side walls 13 are of non-reflecting material while the top wall 15 carries a reflecting element 22 which covers substantially the entire inner face of said wall. Reflecting elements 23 and 24 are secured to the sides 13 and arranged in spaced relation and extend rearwardly from the lens rim 16 in an upwardly inclined direction and by referring to Figure 2 it will be noted that the reflecting element 24 is of greater length than the reflecting element 23. The reflecting elements 23 and 24 have their lower surfaces mirrored while their upper surfaces are non-reflecting.

A reflector 25 is mounted in the section 4 of the casing and includes portions 26, 27 and 28. The portions 26, 27 and 28 are integrally connected and secured to the sides 11 and the sections 26 and 27 are arranged at a slight angle relative to each other while the portion 28 is of semi-cylindrical shape. A suitable electric lamp socket 29 is supported by the rear wall 12 of the section 4 and extends into the portion 28 of the reflector 25 and receives therein the electric lamp 2. The lower part of the portion 28 underlies the electric lamp 2 for the purpose of receiving a portion of the light rays from the electric lamp and reflecting said light rays upwardly within the casing. The light rays extending upwardly in the casing are reflected by the portions 26 and 27 against the reflector 22 which reflects said light rays downwardly and forwardly through the lens 18. The portion of the light rays from the electric lamp 2 that extends forwardly from said lamp engages the reflecting surfaces of the reflecting elements 23 and 24 and are reflected downwardly and forwardly through the lens, thus preventing the electric lamp from casting direct rays of light outwardly through the lens and as all of the light rays are reflected downwardly and forwardly, a person approaching the light will not be blinded by any direct rays of light from the lamp as customary in the type of automobile lamps now employed.

Referring to my modified form of invention as shown in Figures 3 and 4, the casing 30 is constructed similar to the casing 1 and includes the sections 31 and 32 and the top wall of the section 32 is mirrored or provided with a reflecting surface upon its inner face. The electric lamp 33 is supported by an electric lamp socket 34 carried by the section 31. A reflector 35 is mounted in the section 31 and includes an arcuate shaped portion 36 terminating at its lower end into a substantially cup shaped portion 37. The electric lamp 33 is located within the cup shaped portion and the lower half thereof is shielded by the portion 37 so that the light rays extending downwardly are reflected upwardly and rearwardly against the portion 36 and the portion 36 reflects said rays of light and the rays of light extending upwardly and rearwardly from the electric light 33 forwardly against the top wall 32 and the latter reflects the rays of light downwardly and forwardly through the lens carried by the section 32. With this arrangement direct rays of light outwardly of the casing through the lens from the electric lamp will be prevented, consequently obviating disagreeable glare to approaching persons and provides an efficient illumination for the roadway in advance of the device so that the driver of the respective automobile may have efficient illumination of the roadway.

The particular shape of the casing heretofore described may be varied and also the electric lamp may be arranged perpendicularly within the casing or at an inclination instead of horizontally as shown in Figure 4.

While I have shown and described the preferred embodiment of my invention, it will be understood that minor changes in construction, combination and arrangement of parts may be made without departing from the spirit and scope of my invention, as claimed.

Having thus described my invention, what I claim is:

A headlight comprising a casing having a rectangular shaped opened front end, a lens closing said end of the casing, a portion of the top wall of said casing inclining upwardly and rearwardly from the lens, a reflector carried by the casing and covering said portion of the top wall, spaced reflectors in the casing and located below the first reflector and extending upwardly and rearwardly from the lens, an illuminating means in the casing, and a reflector in the casing and including an upwardly and forwardly inclined portion and an arcuately curved portion having the illuminating means located therein.

In testimony whereof I affix my signature.

ELMER A. SEABERG.